Figure 1:
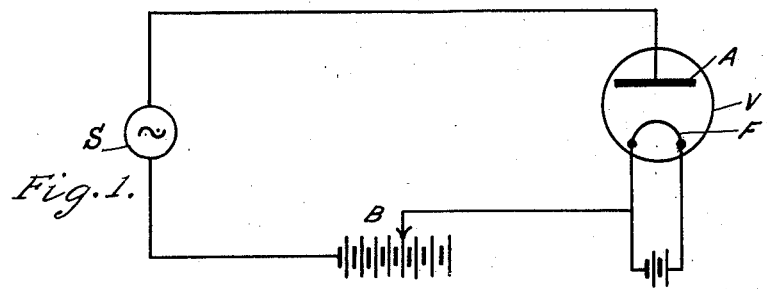

July 13, 1926.

J. SCOTT-TAGGART

MODULATION SYSTEM

Filed July 5, 1921    2 Sheets-Sheet 1

Inventor
John Scott-Taggart

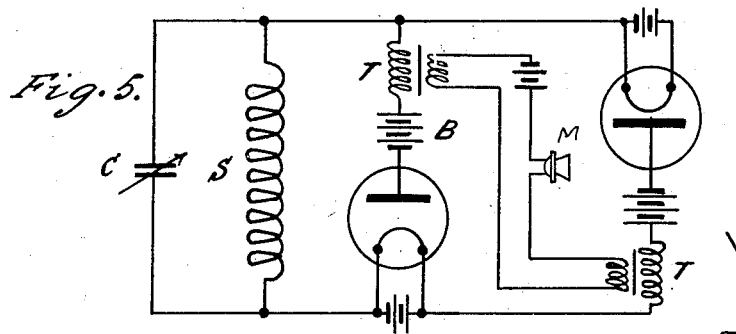
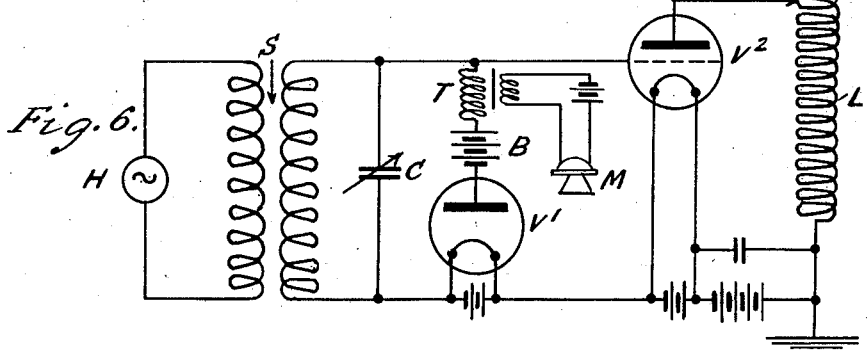
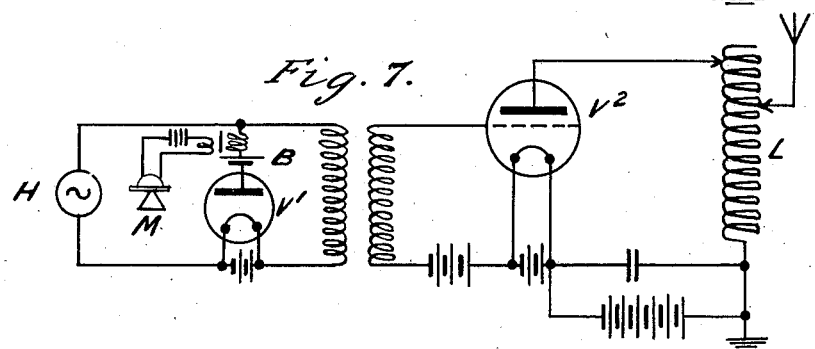
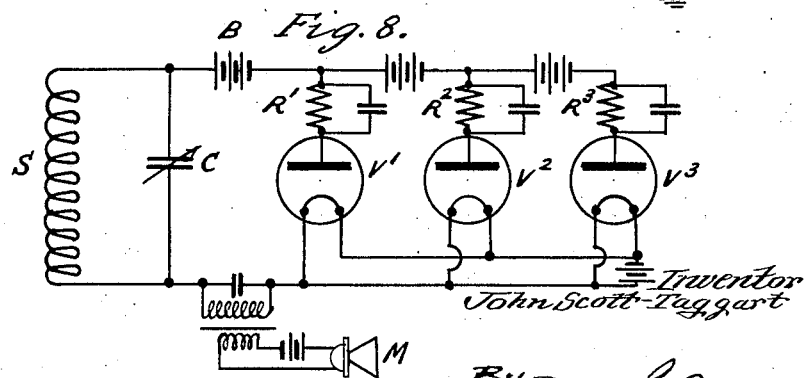

Patented July 13, 1926.

1,592,710

UNITED STATES PATENT OFFICE.

JOHN SCOTT-TAGGART, OF LONDON, ENGLAND.

MODULATION SYSTEM.

Application filed July 5, 1921, Serial No. 482,528, and in Great Britain July 17, 1920.

This invention relates to signalling apparatus particularly for use in wireless signalling systems.

It is proposed to use a current absorbing device comprising a rectifier to which separate current variations are applied. The rectifier has preferably unilateral conductivity but must have asymmetrical conductivity. Various types of rectifier are suitable but I prefer to use two-electrode electron discharge devices or valves.

Relays have previously been used for the purpose of absorbing energy from a circuit. For example, mercury vapour tubes with varying magnetic field and three-electrode valves operating as relays (sometimes connected in parallel to produce progressive absorption) have been thus employed for modulating oscillations in wireless telephone apparatus. The term "rectifier" is therefore used to distinguish my invention from such devices. In my invention I apply varying currents to the main electrodes of the rectifier.

The invention consists in the application of a rectifier acting as a current absorbing device to signalling systems, particularly wireless telephony, separate current variations being applied to the rectifier. The invention usually employs a rectifier in parallel with a source of oscillations, audio frequency potentials being applied to the electrodes of the rectifier.

The invention in part provides for apparatus comprising a rectifier having a bend in its voltage current curve to which is applied alternating or oscillating current and also a low frequency signalling current which, by varying the potential differences across the rectifier enables the latter to pass varying amounts of current produced by the alternating electromotive forces. The current through the rectifier is preferably zero when the low frequency currents are not applied and the potential across its electrodes is preferably normally such that no current due to the oscillating potentials passes through the rectifier, although these are not essential conditions. Applied potentials, usually of audio frequency, will vary the operating point on the voltage current curve of the rectifier and so allow varying amounts of current due to the oscillating potentials to pass through the rectifier. The rectifier which has been found most suitable is a two-electrode valve comprising an incandescent cathode and an anode. High-frequency potentials are usually applied across cathode and anode, a fixed negative potential being applied to the anode so that the valve passes no current. By applying a variable potential to the anode, the negative potential on the anode may be neutralized to a greater or less extent and varying amounts of current due to the high-frequency potentials are allowed to pass through the valve, the current thus passed depending upon the magnitude of the applied variable potentials.

Figure 2:
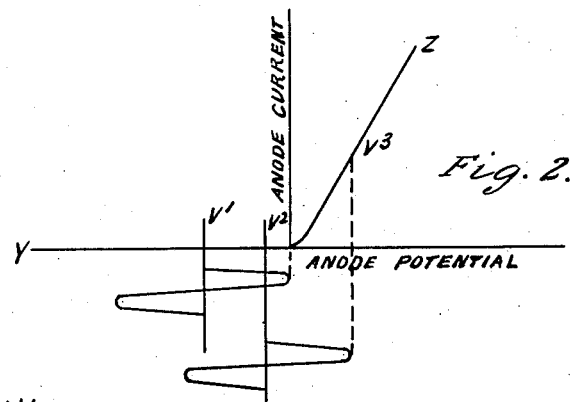
Figure 3:
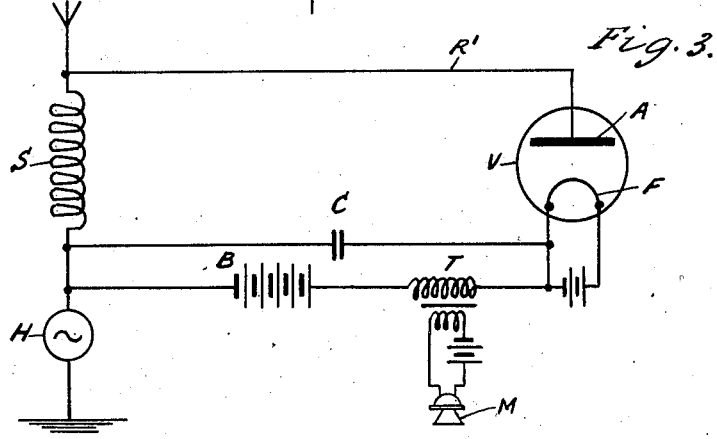
Figure 4:
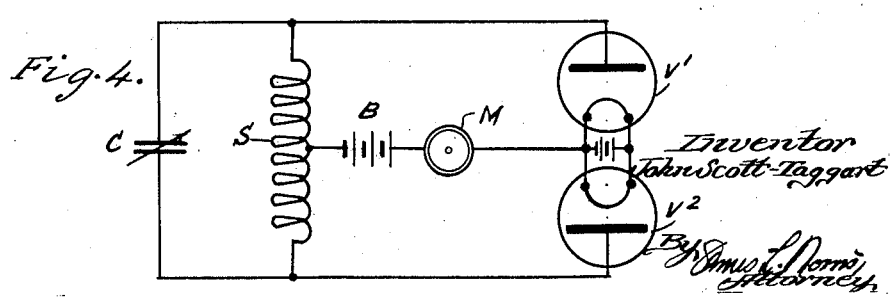

The invention also provides for a radio signalling system wherein high-frequency oscillations are modulated by low frequency currents such as those obtained from a microphone. The high-frequency and microphone potentials are both applied simultaneously to the rectifier. The rectifier, preferably a two-electrode valve, may be arranged as a damping device which will absorb the high-frequency energy to an extent depending upon the low-frequency potentials. As the rectifier will only conduct one half of the cycle of oscillating current, two opposed rectifiers may be used or else a rectifier with one cathode and two anodes. The invention also provides for a method of absorption wherein several valves are arranged to absorb current progressively. These applications of the invention, excluding others of minor importance, will now be further explained with reference to the drawings, wherein Figs. 1 and 2 are diagrams illustrative of the principles on which the invention is based; Fig. 3 a diagram illustrative of the application of the invention to wireless telephony; Figs. 4 and 5 are modified arrangements employing two opposed rectifiers; Figs. 6 and 7 are modulation systems employing an amplifier; and Fig. 8 a further modification adapted for the absorption of large currents.

Fig. 1 shows a rectifier V which takes the form of a two-electrode thermionic valve with anode A and filament F. In the anode circuit is a source of varying current S and a variable battery B which provides a negative potential to the anode. The voltage-current curve of a two-electrode valve is illustrated by $YV' V^2 V^3 Z$ in Fig. 2. The valve is operated at a point to the left of zero potential, for example $V'$. If the currents from S are oscillatory, the potential of the anode, as shown, does not become positive but may become zero. Under these conditions the valve does not conduct. If, however, we lessen the effect of the negative potential on A, by decreasing B or applying a positive potential in series, the normal or base-line anode potential will become, say, $V^2$ and the positive half-cycles will tend to cause the representative point to travel up the curve to the point $V^3$. The moment the potential of A becomes positive current flows through the valve which now absorbs current and tends to cut off that portion of the positive half-cycle which lies to the right of zero anode volts. The valve may thus be used as an energy-absorbing device in which the energy diverted will vary approximately as the voltage applied by B or a separate source varying the anode potential in a positive direction. To help to dissipate the absorbed energy, a resistance may be included in the anode circuit and this resistance may be shunted by a condenser. Although a fixed negative potential is shown applied to the rectifier, yet when a valve is used it may be of the three-electrode type, a fixed negative potential which is never varied being applied to the grid instead of being inserted in the anode circuit. The high and low frequency potentials are still, as before, applied to the anode. When such a valve is used, it is not operating as a relay, but merely as a modified two-electrode rectifier. The advantage of the arrangement is that instead of applying a large negative potential to the anode, a much smaller negative potential is applied to the grid to render the rectifier non-conducting when the low-frequency potentials are not applied.

A wireless telephone which uses the rectifier as an absorbing device is shown in Fig. 3. A source H of high-frequency current supplies the aerial circuit which includes the inductance S in parallel with which the rectifier V is connected. The anode A is given a negative potential by means of the source of potential B which has in series with it the secondary winding of a microphone transformer T, the microphone being represented by M. The condenser C may be connected as shown. The battery B has such a value that a variation of anode voltage produced by M will vary the value of the current passed by V due to the applied oscillating potentials. The condition of affairs may be as illustrated in Fig. 2, where the fixed negative potential equals the positive high-frequency potentials. In this case the valve only conducts when speaking. On the other hand, a useful adjustment is obtained when the fixed base-line potential is such that it equals about half the amplitude of the positive half-cycle. The valve will now be absorbing energy when not speaking. When speaking, the positive half-cycles of microphone potential will lessen the negative base-line potential and cause a greater absorption of energy. The negative half-cycles will decrease the absorption of energy. A special but not convenient adjustment is obtained by making the anode potential zero and preferably applying only negative half-cycles of the modulating potentials. The absorption is thus normally a maximum and decreases when speaking. It will be readily seen that since the absorption is substantially proportional to the microphone potentials, very good articulation is obtained in practice. The absorbing rectifier may, of course, be shunted across an oscillatory circuit coupled to the aerial system. There are so many methods of carrying this invention into effect involving minor variations, that it is not proposed to deal in the description with any but the more important ones.

In Figs. 4, 5 and 6 the source of applied high-frequency potentials is represented as an oscillatory circuit CS which may be any suitable part of a signalling system, although it need not necessarily be an oscillatory circuit.

Fig. 4 shows the use of two rectifiers V' and $V^2$ which are arranged to absorb or conduct alternate half-cycles of applied high-frequency current. The modulating potentials are supplied by M and vary the base-line potentials across the rectifier electrodes. A midway tapping is taken from the inductance S.

Fig. 5 shows another arrangement where two opposed rectifiers are connected across the oscillatory circuit. Each has a negative potential on its anode which is varied by a common microphone M.

Fig. 6 shows a modulation system in which the absorbing rectifier is connected across the grid and filament of an amplifier valve $V^2$ having an output system L. The high-frequency output of $V^2$ is modulated when speaking into M. Any of the arrangements shown or modifications of them may be used in a system of this kind where the modulated currents are amplified. Fig. 7 is another absorption circuit in which the modulated high-frequency current is amplified. In this and all the other circuits the original source of oscillations may conveniently be an oscillating valve system of some kind or other. The modulating potentials may, of course, be amplified in known manner when desired.

Fig. 8 is a modified arrangement of the invention. Where large currents are to be absorbed, instead of connecting the rectifiers in parallel in the ordinary way, it is preferred to connect them in parallel in such a way that their conductivity varies in succession. This may be accomplished by grading the negative potentials on their anodes substantially as shown in Fig. 8.

Resistances R', R², R³ shunted by condensers may be inserted in each anode circuit.

The invention is applicable to all forms of signalling and for both transmission and reception where the varying absorption property of a rectifier is capable of utilization. For example when receiving continuous waves, the oscillations might be modulated at audible frequency according to this invention so as to render them audible after rectification.

Having thus described the nature of the said invention and the best means I know of carrying the same into practical effect, I claim:—

1. The method of modulating radio-frequency currents for wireless telephonic and like communication which comprises controlling the conductivity of a two-electrode rectifier to radio-frequency currents applied thereto by impressing low-frequency modulating currents on the anode voltage thereof and applying a steady negative potential thereto of a value which will substantially prevent the flow of radio-frequency currents while no modulating currents are impressed on the anode voltage.

2. In wireless signalling systems a current-absorbing device comprising a two-electrode rectifier shunted by an inductance traversed by high frequency oscillations, a source of steady negative potential of a value not greater than the amplitude of the said high frequency oscillations connected with the anode of the said rectifier, and means for applying low frequency modulating potentials to the said anode.

3. In wireless signalling systems, a current-absorbing device comprising a plurality of two-electrode rectifiers connected in parallel with each other and with an inductance traversed by radio-frequency currents, sources of steady negative potentials of graded values connected with the anodes of the said two-electrode rectifiers and microphonic means for varying simultaneously the potentials of the said anodes.

4. A high frequency telephone transmitter particularly for wireless telephony comprising an amplifier the output circuit of which is associated with an aerial and the input circuit of which is separately excited by a source of continuous oscillations, a two-electrode valve having a negative potential on its anode being connected in shunt with the input circuit, and means being provided for varying microphonically the potential on the anode of the two-electrode valve.

In testimony whereof I have signed my name to this specification.

JOHN SCOTT-TAGGART.